(12) United States Patent
Hart et al.

(10) Patent No.: US 10,167,430 B2
(45) Date of Patent: Jan. 1, 2019

(54) CATALYTIC HYDROTHERMAL LIQUEFACTION FOR BIO-OIL PRODUCTION

(71) Applicant: Battelle Memorial Institute, Richland, WA (US)

(72) Inventors: Todd R. Hart, Kennewick, WA (US); Douglas C. Elliott, Richland, WA (US); Andrew J. Schmidt, Richland, WA (US); Richard T. Hallen, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 102 days.

(21) Appl. No.: 15/195,553

(22) Filed: Jun. 28, 2016

(65) Prior Publication Data

US 2017/0369789 A1    Dec. 28, 2017

(51) Int. Cl.
*C10G 3/00* (2006.01)
*C10G 1/06* (2006.01)

(52) U.S. Cl.
CPC ............ *C10G 3/47* (2013.01); *C10G 1/06* (2013.01); *C10G 3/50* (2013.01); *C10G 2300/1014* (2013.01); *C10G 2300/202* (2013.01)

(58) Field of Classification Search
CPC ... C10G 3/00; C10G 3/47; C10G 3/50; C10G 1/06
See application file for complete search history.

(56) References Cited

U.S. PATENT DOCUMENTS

| | | | | |
|---|---|---|---|---|
| 4,430,253 A | * | 2/1984 | Dubeck | B01J 23/462 502/185 |
| 5,252,199 A | | 10/1993 | Singhal et al. | |

(Continued)

FOREIGN PATENT DOCUMENTS

| | | |
|---|---|---|
| CN | 102676201 A | 9/2012 |
| CN | 103060075 A | 4/2013 |

(Continued)

OTHER PUBLICATIONS

Ramirez et al. (A review of hydrothermal liquefaction bio-crude properties and prospects for upgrading to transportation fuels, Energies, 2015, vol. 8, pp. 6765-6794, (Year: 2015).*

(Continued)

*Primary Examiner* — In Suk C Bullock
*Assistant Examiner* — Youngsul Jeong
(74) *Attorney, Agent, or Firm* — Klarquist Sparkman, LLP

(57) ABSTRACT

Embodiments of a method for producing bio-oil include hydrothermal liquefaction of a biomass (e.g., a lignocellulosic biomass) feedstock to provide a process stream comprising crude oil and an aqueous fraction. The process stream is catalytically upgraded by contact with a sulfided-ruthenium catalyst, in the absence of added hydrogen, at a temperature and pressure effective to reduce an oxygen content of the crude oil, reduce a nitrogen content of the crude oil, reduce a total acid number of the crude oil, increase a H:C mole ratio of the crude oil, reduce a density of the crude oil, reduce a moisture content of the crude oil, reduce viscosity of the crude oil, or any combination thereof, thereby producing an upgraded oil and an upgraded aqueous fraction, which are subsequently separated. The catalytic upgrading process may be a plug-flow process and/or may be performed at or near liquefaction conditions.

19 Claims, 3 Drawing Sheets

(56) References Cited

U.S. PATENT DOCUMENTS

| | | |
|---|---|---|
| 8,241,605 B2 | 8/2012 | Elliott et al. |
| 8,741,258 B2 | 6/2014 | Huber et al. |
| 2012/0055077 A1 | 3/2012 | Savage et al. |
| 2014/0007492 A1 | 1/2014 | Castellví Barnés et al. |
| 2015/0291892 A1 | 10/2015 | Rover et al. |

FOREIGN PATENT DOCUMENTS

| | | |
|---|---|---|
| CN | 102851062 B | 12/2014 |
| CN | 103756711 B | 6/2015 |

OTHER PUBLICATIONS

Choi (DOE Bioenergy Technologies Office (BETO) 2015 Project Peer Review) (Year: 2015).*
Forghani (Catalytic hydro-cracking of bio-oil to bio-fuel, the University of Adelaide, Australia, PhD Thesis, 2014 (Year: 2014).*
Capunitan et al. (Hydrotreatment of corn stover bio-oil using noble metal catalysts. Fuel Process. Technol. 2014, 125, 190-199, (Year: 2014).*
Huber et al. (Synthesis of transportation fuels from biomass: Chemistry, catalysts, and engineering, Chem. Rev. 2006, 106, (Year: 2006) 4044-4098).*
"An Overview of Catalyst Sulfiding," *Gaylord Chemical Company, L.L.C.*, Bulletin # 205B, 8 pp., Oct. 2007.
Elliott et al., "Hydrocarbon Liquid Production from Biomass via Hot-Vapor-Filtered Fast Pyrolysis and Catalytic Hydroprocessing of the Bio-oil," *Energy & Fuels*, 28(9):5909-5917, 2014.
Elliott et al., "Hydrothermal liquefaction of biomass: Developments from batch to continuous process," *Bioresource Technology*, 178:147-156, 2015.
Hammerschmidt et al., "Catalytic conversion of waste biomass by hydrothermal treatment," *Fuel*, 90:555-562, 2011.
Knežević, "Hydrothermal Conversion of Biomass," Thesis from the University of Twente, Netherlands, 159 pp., Sep. 3, 2009.
"Licella, Air NZ, Virgin, Norske Skog ink pacts to develop aviation fuels from bio-oil," *Biofuels Digest*, 2 pp. Dec. 14, 2011.
Luo et al., "Catalytic Hydrothermal Liquefaction of Soy Protein Concentrate," *Energy & Fuels*, 29:3208-3214, 2015.
Nielsen et al., "CatLiq—High pressure and temperature catalytic conversion of biomass: The CatLiq technology in relation to other thermochemical conversion technologies," *Biomass & Energy*, 39:399-402, 2012.
Tews et al., "Biomass Direct Liquefaction Options: TechnoEconomic and Life Cycle Assessment," *Pacific Northwest National Laboratory*, PNNL-23579, 62 pp., Jul. 2014.
Toor et al., "Continuous production of bio-oil by catalytic liquefaction from wet distiller's grain with solubles (WDGS) from bio-ethanol production," *Biomass & Energy*, 36:327-332, 2012.
Vispute et al., "Renewable Chemical Commodity Feedstocks from Integrated Catalytic Processing of Pyrolysis Oils," *Science*, 330:1222-1227, Nov. 26, 2010.

* cited by examiner

US 10,167,430 B2

CATALYTIC HYDROTHERMAL LIQUEFACTION FOR BIO-OIL PRODUCTION

ACKNOWLEDGMENT OF GOVERNMENT SUPPORT

This invention was made with government support under DE-AC0576RL01830 awarded by the U.S. Department of Energy. The government has certain rights in the invention.

FIELD

This invention concerns embodiments of method for producing bio-oil from biomass, particularly from a lignocellulosic biomass.

BACKGROUND

Hydrothermal liquefaction (HTL) is a thermal depolymerization process used to convert wet biomass into bio-oil. Typical hydrothermal conditions include temperatures from 523-647 K and operating pressures from 4-22 MPa (Elliott et al., *Bioresource Technology* 2015, 178:147-156). The resulting bio-oil, however, is often viscous and includes undesirably high levels of oxygen. The crude bio-oil components include, for example, acids, alcohols, cyclic ketones, phenols, methoxy-phenols, naphthols, and/or benzofurans. The crude bio-oil is hydrotreated to reduce the viscosity and oxygen content for subsequent fuel use.

SUMMARY

This disclosure concerns a method for producing bio-oil from biomass, such as lignocellulosic biomass. Embodiments of a method for producing bio-oil from lignocellulosic biomass include (i) hydrothermally liquefying a lignocellulosic feedstock comprising a lignocellulosic biomass and water to produce a composition comprising a crude oil, an aqueous fraction, and inorganic solids; (ii) separating the inorganic solids from the crude oil and the aqueous fraction to provide a process stream comprising the crude oil and the aqueous fraction; and (iii) contacting the process stream with a sulfided-ruthenium catalyst, in the absence of added hydrogen, at an operating temperature and pressure effective to reduce an oxygen content of the crude oil, reduce a nitrogen content of the crude oil, reduce a total acid number of the crude oil, increase a H:C mole ratio of the crude oil, reduce a density of the crude oil, reduce a moisture content of the crude oil, reduce viscosity of the crude oil, or any combination thereof, thereby producing an upgraded oil and an upgraded aqueous fraction, wherein the sulfided-ruthenium catalyst comprises Ru, S, and a support, and has a Ru:S weight ratio within a range of from 10:1 to 25:1 prior to contact with the process stream. Contacting the process stream with the catalyst may be performed at a liquid hourly space velocity, LHSV, of 0.5-30 hr$^{-1}$. In any or all of the above embodiments, the method may be a plug-flow process.

In any or all of the above embodiments, the catalyst may comprise from 1-10 wt % ruthenium based on a combined mass of the ruthenium and the support. In any or all of the above embodiments, the support may comprise partially graphitized carbon, activated carbon, rutile titania, or zirconia. In some embodiments, the support comprises partially graphitized carbon having a graphite-type structure content within a range of from 50 to 95 wt %.

In any or all of the above embodiments, contacting the process stream with the catalyst may be performed at an operating temperature within a range of from 250° C. to 364° C. In some embodiments, contacting the process stream with the catalyst is performed at a pressure sufficient to maintain the process stream in liquid phase without forming a supercritical fluid. In some examples, the pressure is within a range of from 2.5 MPa to 4.5 MPa greater than a vapor pressure of the process stream at the operating temperature. In certain embodiments, contacting the process stream with the catalyst is performed at an operating temperature within a range of from 340° C. to 360° C. and a pressure within a range of from 18 MPa to 22 MPa.

In any or all of the above embodiments, the lignocellulosic feedstock may comprise 5-30 wt % lignocellulosic biomass. In any or all of the above embodiments, the lignocellulosic biomass may comprise 20-40 wt % lignin based on the dry matter mass of the lignocellulosic biomass. In some embodiments, the lignocellulosic biomass comprises ≤1.5 wt % sulfur based on the dry matter mass of the lignocellulosic biomass, and/or the lignocellulosic feedstock comprises from 1 ppm to 1,000 ppm sulfur by weight.

In any or all of the above embodiments, the sulfided ruthenium catalyst may be prepared by exposing a ruthenium catalyst to an aqueous solution comprising a sulfate salt, in the absence of added hydrogen, to produce the sulfided ruthenium catalyst. In some embodiments, the aqueous solution comprises from 100 ppm to 1000 ppm sulfate. The ruthenium catalyst may be exposed to the aqueous solution at an operating temperature within a range of from 250° C. to 364° C. In some embodiments, the ruthenium catalyst is exposed to the aqueous solution at a pressure that maintains the aqueous solution in liquid phase at the operating temperature without forming a supercritical fluid.

In any or all of the above embodiments, hydrothermally liquefying the lignocellulosic feedstock may comprise subjecting the lignocellulosic feedstock to an effective liquefaction temperature and liquefaction pressure to thermally depolymerize organic constituents of the lignocellulosic biomass. In some embodiments, the liquefaction temperature is within a range of 250-364° C. and the liquefaction pressure is greater than a vapor pressure of the lignocellulosic feedstock at the liquefaction temperature.

Embodiments of an oil produced by the foregoing method may have an oxygen content within a range of 1-12 wt %, a nitrogen content within a range of 0-1 wt %, a H:C mole ratio from 1.2 to 1.3, a water content within a range of 0.01-5 wt %, a total acid number within a range of 10-50, a density within a range of 0.9-1.2 g/mL, a viscosity within a range of 100-3200 cSt, or any combination thereof.

The foregoing and other objects, features, and advantages of the invention will become more apparent from the following detailed description, which proceeds with reference to the accompanying figures.

DETAILED DESCRIPTION

Figure 1A:
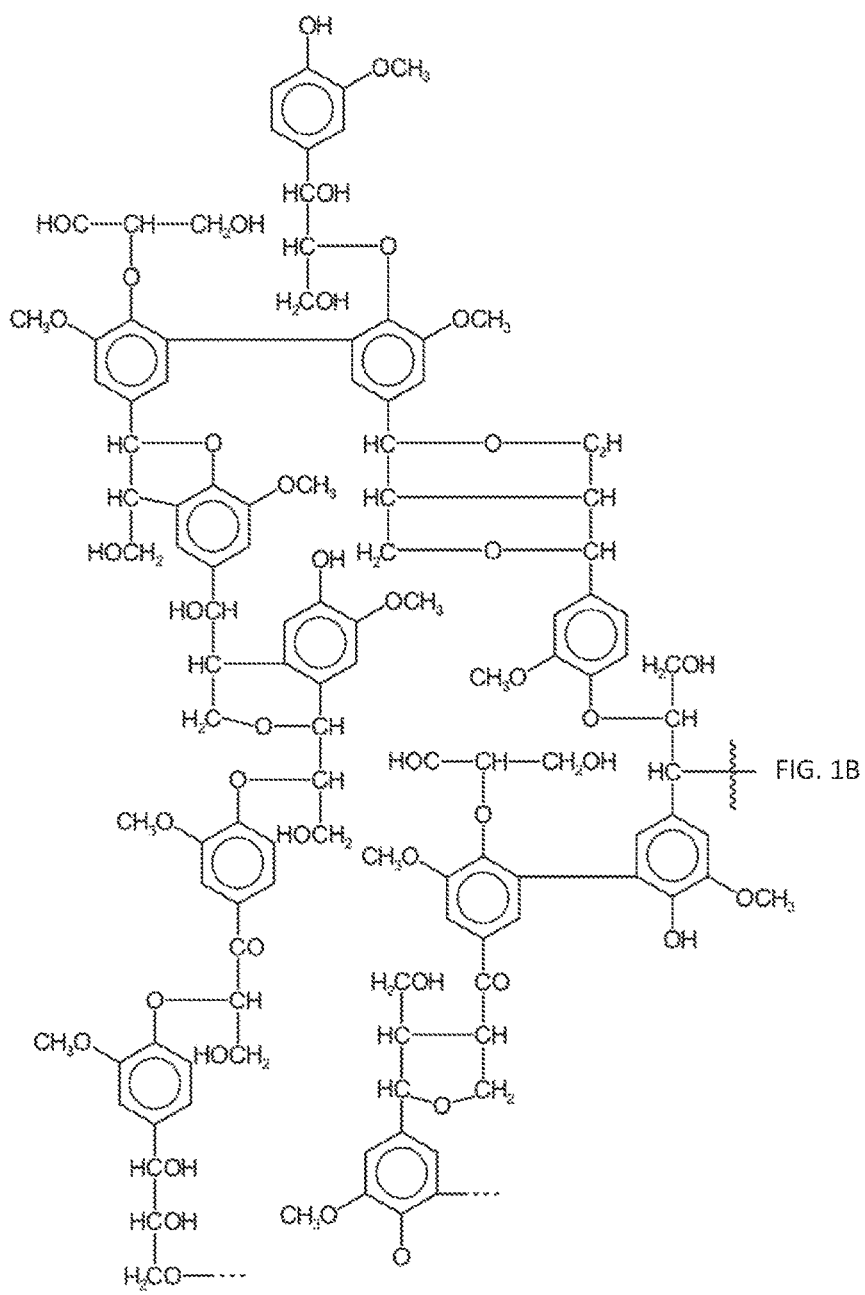
FIGS. 1A and 1B are a chemical structure of an exemplary lignin polymer.

Embodiments of a sulfided ruthenium catalyst and method for production of bio-oil from a biomass, such as a lignocellulosic biomass, are disclosed. A crude bio-oil is obtained by hydrothermal liquefaction of a lignocellulosic feedstock. The bio-oil is subsequently upgraded by exposure to a sulfided ruthenium catalyst under conditions effective to cause steam reforming, hydrodeoxygenation, and/or denitrification of the crude bio-oil, thereby producing a higher quality oil with a lower oxygen content, a lower nitrogen content, a lower acidity, a higher H:C mole ratio, a lower density, a lower moisture content, and/or a lower viscosity than the crude oil.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Definitions of common terms in chemistry may be found in Richard J. Lewis, Sr. (ed.), *Hawley's Condensed Chemical Dictionary*, published by John Wiley & Sons, Inc., 1997 (ISBN 0-471-29205-2).

In order to facilitate review of the various embodiments of the disclosure, the following explanations of specific terms are provided:

Activated Carbon: Microporous carbon with a surface area in excess of 500 m$^2$/g. As used herein, microporous means having pores with a diameter less than 2 nm.

Bio-oil: Oil produced from biomass (e.g., plant matter, forestry residues/waste, crop residues/waste, etc.). As used here, the terms "bio-oil" and "oil" are interchangeable, with both terms referring to oil produced from biomass.

Denitrification or hydrodenitrogenation: The removal of nitrogen or nitrogen-containing compounds (e.g., amines, nitrates).

Graphitic carbon: Graphitic carbon comprises carbon in the allotropic form of graphite, irrespective of the presence of structural defects and the percentage of the graphite structure. Graphitic carbon has at least some domains exhibiting three-dimensional hexagonal crystalline long-range order as detected by diffraction methods (*IUPAC Compendium of Chemical Terminology*, 2nd ed. (the "Gold Book"), compiled by A. D. McNaught and A. Wilkinson, Blackwell Scientific Publications, Oxford (1997). XML on-line corrected version: http://goldbook.iupac.org (2006-) created by M. Nic, et al.; updates compiled by A. Jenkins. ISBN 0-9678550-9-8. doi:10.1351/goldbook, updated Feb. 24, 2014, version 2.3.3).

Graphitized carbon: As defined by IUPAC, graphitized carbon is a graphitic carbon with more or less perfect three-dimensional hexagonal crystalline order prepared from nongraphitic carbon by graphitization heat treatment, i.e., heat treatment at temperature within a range of 2500-3300 K (Ibid.). As used herein, the term partially graphitized carbon refers to graphitic carbon with a graphite-type structure content within a range of from 20 to 99% by weight, such as from 50 to 99% or from 80-95% by weight.

Hydrodeoxygenation (HDO): A hydrogenolysis reaction that utilizes hydrogen to remove oxygen from oxygen-containing compounds. Hydrodeoxygenation can be performed in the presence of added hydrogen or by utilizing hydrogen produced when light organics (e.g., methanol, ethanol, glycolic acid) are reformed or decomposed. One exemplary hydrodeoxygenation reaction is the conversion of phenol to benzene in the presence of hydrogen: $C_6H_5OH + H_2 \rightarrow C_6H_6 + H_2O$.

Hydrothermal liquefaction: Thermochemical liquefaction of biomass into liquid fuels by processing in a hot, pressurized water environment for sufficient time to depolymerize the solid polymeric structures into mainly liquid components. Biomass polymers such as cellulose, hemicellulose, and lignin are thermally cracked. A portion of the oxygen present in the polymers is removed by dehydration and decarboxylation reactions.

Figure 1B:
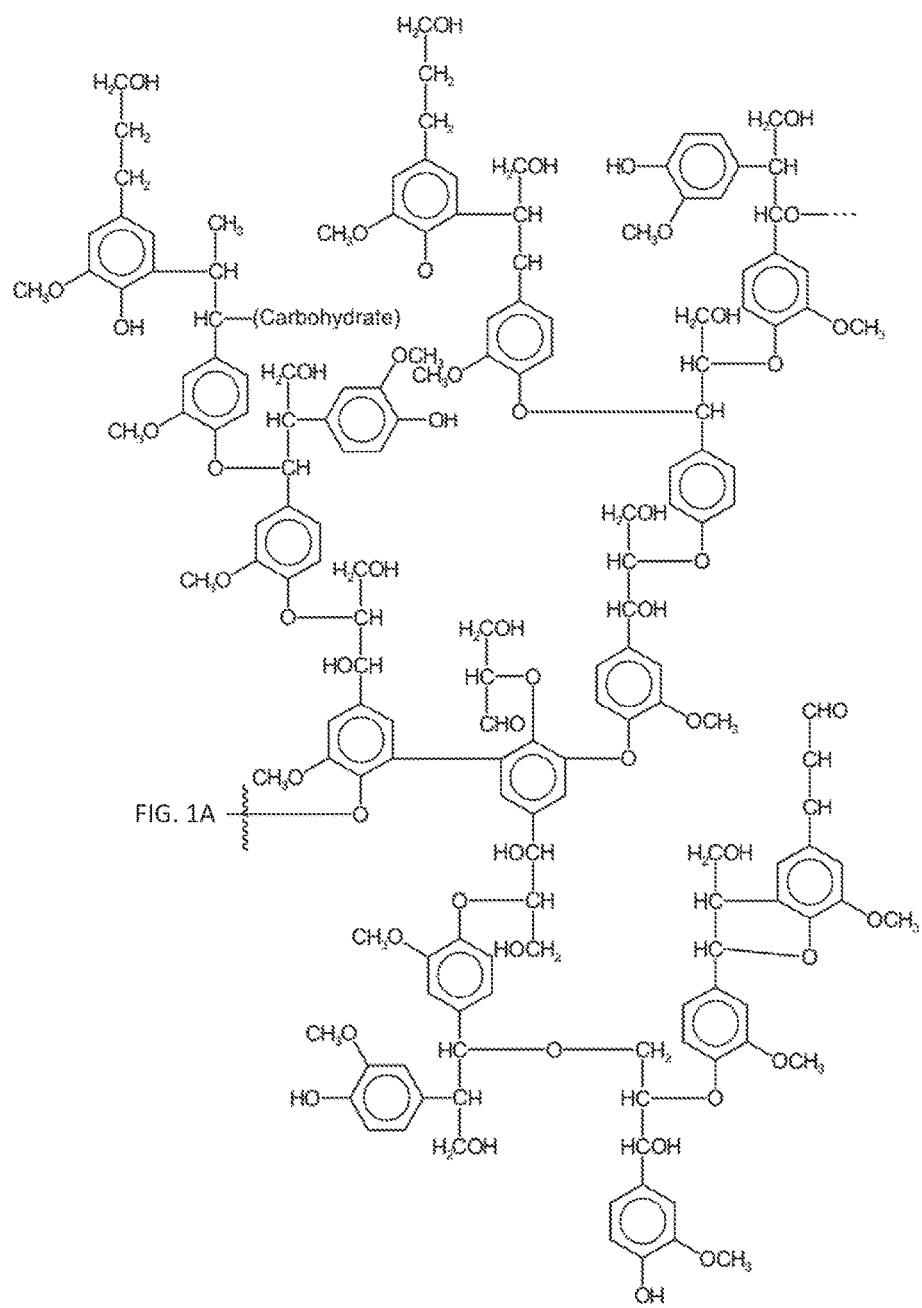

Lignocellulose: The term lignocellulose, or lignocellulosic biomass, refers to plant dry matter, or biomass, comprising carbohydrate polymers (e.g., cellulose, hemicellulose) and lignin, an aromatic polymer. The composition of lignin varies from plant species to species. One exemplary structure of lignin is shown in FIGS. 1A and 1B. As used herein, the term lignocellulosic biomass refers to biomass including 10-40 wt % lignin based on the total dry matter mass.

Liquid hourly space velocity (LHSV): The feedstock liquid volumetric flow rate/catalyst bed volume. LHSV is reported in units of hr$^{-1}$.

Plug flow process: A process in which flow through a tubular reactor is continuous, usually at a substantially steady rate, such that composition of a fluid flowing through the reactor and other dependent variables are functions of position within the reactor rather than of time. A substantially steady rate means that the flow rate through the reactor varies less than ±5% relative to an average flow rate. In an ideal reactor, the process stream flows as if it were a solid plug, and its properties, including temperature, are assumed to be uniform across any cross-section of the reactor.

Rutile titania: A stable polymorph of titanium dioxide having a body-centered tetragonal unit cell where a=b=4.584 Å and c=2.593 Å. The titanium cations have a coordination number of 6, and the oxygen anions have a coordination number of 3.

Steam reforming: The decomposition of organic compounds in the presence of water vapor to produce hydrogen and carbon monoxide or carbon dioxide. For example, methane reacts to form carbon monoxide and hydrogen, whereas methanol reacts to form carbon dioxide and hydrogen.

Sulfided catalyst: As used herein, the term "sulfided catalyst" refers to a metal-containing catalyst having sulfur bound to some fraction of the active metal (catalyst).

Supercritical fluid: A fluid maintained above its critical temperature (the temperature above which the fluid cannot be liquefied by pressure) where distinct liquid and gas phases do not exist.

Total acid number (TAN): A measurement of acidity reported as the amount of KOH (in milligrams) needed to neutralize the acids in one gram of oil.

II. Sulfided Ruthenium Catalyst

Embodiments of a sulfided ruthenium catalyst for upgrading bio-oil are disclosed. The disclosed catalysts participate in a variety of reactions, including hydrogen transfer, deoxygenation, and/or denitrification of organic components in oils produced by hydrothermal liquefaction of lignocellulosic feedstocks.

The catalyst comprises sulfided ruthenium on a support. Suitable supports are hydrothermally stable at the operating conditions, e.g., at temperatures up to 364° C. and pressures up to 22 MPa. Exemplary supports include, but are not limited to, partially graphitized carbon, activated carbon (e.g., NORIT® carbon), rutile titania ($TiO_2$), or zirconia ($ZrO_2$). In certain embodiments, the support is partially graphitized carbon, i.e., a portion of the carbon has a graphite-type structure. For example, the partially graphitized carbon may have a graphite-type structure content within a range of from 50 wt % to 95 wt %.

In some embodiments, the catalyst has a Ru:S weight ratio within a range of from 10:1 to 25:1 prior to use. The catalyst may comprise from 1-10 wt % ruthenium, such as from 2-8 wt % Ru, based on a combined mass of the Ru and the support (not including the sulfur mass). Without wishing to be bound a particular theory of operation, sulfided ruthenium is believed to participate in hydrodeoxygenation reactions whereas non-sulfided, reduced ruthenium in the catalyst participates in steam reforming reactions.

Embodiments of the disclosed sulfided ruthenium catalysts may be prepared by sulfiding a ruthenium catalyst. An aqueous sulfate solution is flowed over the catalyst under conditions effective to deposit sulfur onto the catalyst. In some embodiments, sulfiding is performed at elevated temperatures and pressures. For example, sulfiding may be performed at a temperature within a range of 250-364° C. and a pressure within a range of 18-22 MPa. Suitable sulfate sources include alkali metal salts, such as sodium sulfate and potassium sulfate. Alkaline earth metal sulfates typically are not used because they become insoluble at higher temperatures. The sulfate solution may have a concentration of a few hundred ppm sulfate, such as from 100-1000 ppm sulfate, 200-800 ppm, or 300-700 ppm sulfate. The sulfiding process is performed in the absence of added hydrogen. Without wishing to be bound by a particular theory of operation, excess hydrogen may produce "deeper," more extensive and/or irreversible sulfiding, rendering the catalyst less active or completely inactive.

A "spent" ruthenium catalyst that has become sulfided from use in another process also may be suitable. For example, a sulfided Ru/C catalyst from a catalytic hydrothermal gasification process may be used. A Ru/C catalyst performs primarily as a gasification catalyst. Upon exposure to feedstocks including sulfur, the Ru/C catalyst becomes sulfided and then becomes a conversion catalyst capable of performing hydrogen transfer, deoxygenation, and/or denitrification reactions.

III. Production of Bio-Oil

The disclosed process for producing bio-oil utilizes a feedstock comprising biomass and water. In some embodiments, the biomass is lignocellulosic biomass. As used herein, the term "lignocellulosic biomass" refers to biomass having a lignin content within a range of from 10-40 wt % lignin based on a dry matter mass of the biomass. Suitable lignocellulosic biomass sources include, but are not limited to, virgin biomass (e.g., grasses), forestry residues/waste (e.g., wood chips, sawdust, paper mill waste), and crop residues/waste (e.g., corn stover, sugarcane bagasse, straw). The lignocellulosic biomass may be dried before use to produce bio-oil. For example, the lignocellulosic biomass may be dried at 105° C. for 12 hours or longer. In some embodiments, the dried lignocellulosic biomass includes 30-60 wt % cellulose, 15-30 wt % hemicellulose, and 10-40 wt % lignin, such as 40-50 wt % cellulose, 20-25 wt % hemicellulose, and 20-40 wt % lignin. The dried lignocellulosic biomass may include 40-55 wt % carbon, 5-7 wt % hydrogen, 30-45 wt % oxygen, 0.2-0.3 wt % N, and 1-8 wt % ash. Advantageously, the lignocellulosic biomass has a low sulfur content, such as a sulfur content of ≤1.5 wt % based on the dry matter mass of the biomass. In some embodiments, the sulfur content is ≤1 wt %, ≤0.6 wt %, ≤0.1 wt %, ≤0.05 wt %, or ≤0.02 wt %.

The lignocellulosic biomass may be comminuted, such as by chipping, milling (e.g., knife milling), or grinding, to produce smaller particles for more efficient conversion to bio-oil. The lignocellulosic biomass is combined with water to form a lignocellulosic feedstock. The lignocellulosic feedstock may comprise from 5-30 wt % lignocellulosic biomass, such as from 5-25 wt %, 5-20 wt %, 10-20 wt %, or 10-15 wt % lignocellulosic biomass. In some embodiments, the lignocellulosic feedstock comprises up to 1,000 ppm sulfur by weight, such as 1-1,000 ppm, 1-500 ppm, 1-300 ppm, or 1-200 ppm sulfur by weight. In some embodiments, a buffering agent (e.g., sodium carbonate) is added to the feedstock to moderate reaction pH during subsequent processing and minimize char formation. For instance, the feedstock may include up to 2 wt % sodium carbonate, such as from 0.1-2 wt % sodium carbonate. In some examples, the feedstock includes 1 wt % sodium carbonate.

Figure 2:
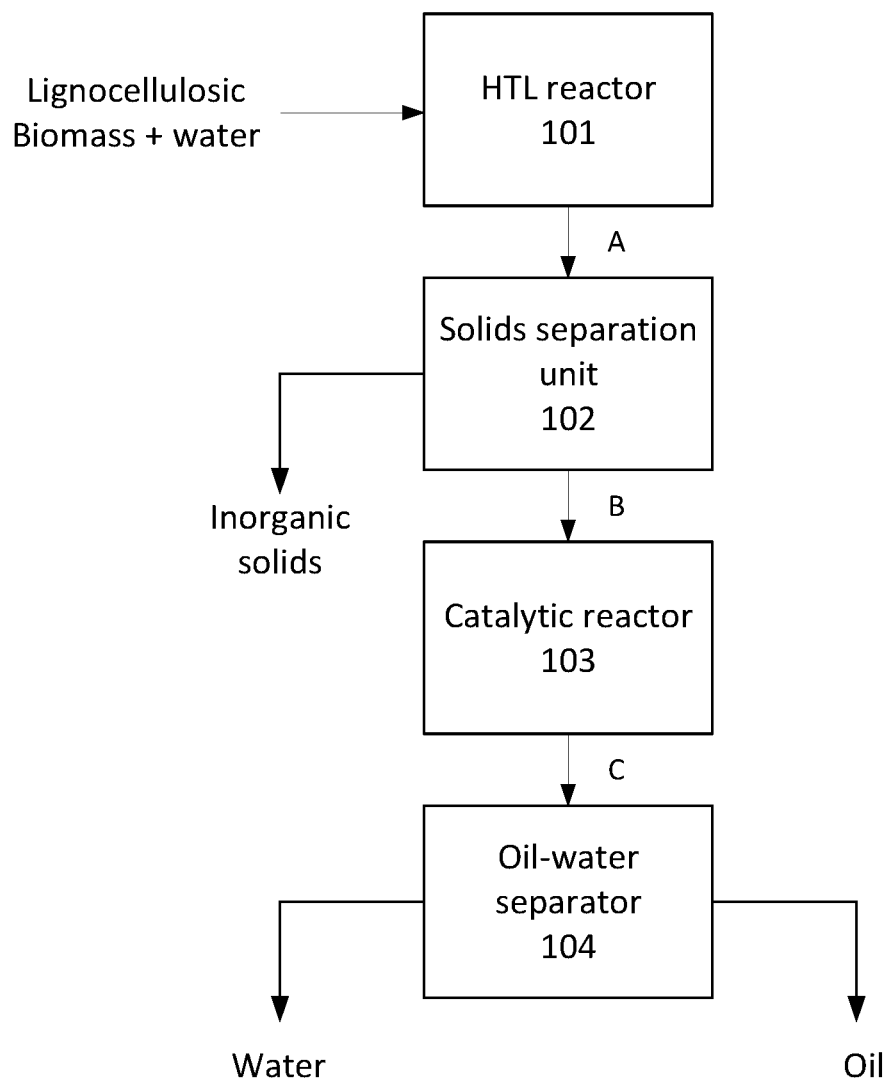
FIG. 2 is a flowchart illustrating an exemplary hydrothermal liquefaction and oil upgrading process.

FIG. 2 provides a broad overview of an exemplary method for producing bio-oil from a lignocellulosic feedstock. In some embodiments, the process is a plug-flow process. In other words, the process is continuous, and is performed at a substantially steady rate such that the composition of the process stream flowing through the system is a function of position within the system rather than of time. The lignocellulosic feedstock is introduced into a hydrothermal liquefaction (HTL) reactor 101 operated at conditions sufficient to depolymerize the biomass, thereby producing a composition A comprising oil, an aqueous fraction, and inorganic solids. Desirably, the lignocellulosic feedstock is introduced continuously and at a substantially steady rate. The aqueous fraction may include water-soluble organic compounds, e.g., methanol, ethanol, glycolic acid, etc. Composition A is filtered in a solids separation unit 102 to remove the inorganic solids and produce a process stream B comprising the oil and the aqueous fraction. The process stream B is flowed through a catalytic reactor 103 including a sulfided ruthenium catalyst, wherein the oil is upgraded and water-soluble organics are decomposed through reactions such as hydrodeoxygenation, denitrification, and/or steam reformation to produce an upgraded process stream C comprising upgraded oil and an aqueous fraction. Advantageously, flow is continuous and is maintained at a substantially steady rate. Upgrading the oil includes reducing an oxygen content of the oil, reducing a nitrogen content of the oil, increasing a H:C mole ratio of the oil, reducing a density of the oil, reducing a moisture content of the oil, reducing viscosity of the oil, or any combination thereof relative to the oil of process stream B. The upgraded oil and aqueous fractions of upgraded process stream C are separated in a separator 104.

As shown in FIG. 2, the lignocellulosic feedstock comprising lignocellulosic biomass and water is introduced into the HTL reactor 101. The HTL reactor is operated at a temperature and pressure effective to thermally depolymerize organic constituents of the lignocellulosic biomass, thereby liquefying the lignocellulosic biomass and producing a composition A comprising crude oil, an aqueous fraction, and inorganic solids. In some embodiments, the HTL reactor is operated at a LHSV within a range of 0.5-30 h$^{-1}$, such as 1-20 h$^1$, 1-10 h$^{-1}$, 1-8 h$^{-1}$, or 1-6 h$^{-1}$. Stated otherwise, the feedstock may have a residence time of from 10 to 60 minutes in the HTL reactor, such as from 12-60 minutes, or from 20-40 minutes. In some embodiments, the effective liquefaction temperature is within a range of from 250° C. to 364° C., such as a temperature from 300° C. to 364° C., from 320° C. to 360° C., or from 340° C. to 360° C. In some examples, the temperature is 350° C. The HTL reactor is operated at a pressure greater than a vapor pressure of the lignocellulosic feedstock at the liquefaction temperature. The temperature and pressure are selected to initiate depolymerization while maintaining the lignocellulosic feedstock in liquid phase and preventing formation of a supercritical fluid. In some embodiments, the pressure is from 2.5 MPa to 4.5 MPa (~400-600 psig) greater than a vapor pressure of the lignocellulosic feedstock at the liquefaction temperature. Suitable pressures may be within a range of from 7.5 MPa to 22 MPa (~1100-3300 psig), such as a pressure of 18-22 MPa. The HTL process differs from pyrolysis by using a wet biomass and producing a crude oil with greater energy density than pyrolysis oil. Composition A is filtered to separate the inorganic solids and any formed char particles from the crude oil and the aqueous fraction, thereby providing a process stream B comprising the crude oil and the aqueous fraction.

The process stream B is introduced into the catalytic reactor 103 wherein the process stream is contacted with a sulfided ruthenium catalyst as disclosed herein. In some embodiments, the catalytic reactor includes a fixed bed of the sulfided ruthenium catalyst. Advantageously, the catalytic reactor is operated in the absence of added hydrogen. The catalytic reactor is operated at a temperature and pressure effective to reduce an oxygen content of the crude oil, reduce a nitrogen content of the crude oil, reduce a total acid number of the crude oil, increase a H:C mole ratio of the crude oil, reduce density of the crude oil, reduce viscosity of the crude oil, or any combination thereof, thereby producing an upgraded oil and an upgraded aqueous fraction. The temperature and pressure are selected to maintain the process stream in liquid phase and prevent formation of a supercritical fluid. In some embodiments, the process stream is contacted with the catalyst at a temperature within a range of from 250° C. to 364° C., such as a temperature from 300° C. to 364° C., from 320° C. to 360° C., or from 340° C. to 360° C. The pressure may be from 2.5 MPa to 4.5 MPa greater than a vapor pressure of the process stream at the operating temperature within the catalytic reactor. For example, the pressure may be within a range of from 7.5 MPa to 22 MPa, such as from 18 MPa to 22 MPa. In certain embodiments, the temperature is within a range of from 340° C. to 360° C., and the pressure is within a range of from 18 MPa to 22 MPa.

The temperature and pressure in the catalytic reactor 103 may be the same as the temperature and pressure in the HTL reactor 101. The temperature and pressure conditions of the HTL reactor also may be maintained as the composition A passes through the solids separation unit 102.

In some embodiments, the process stream B is contacted with the catalyst in the catalytic reactor 103 at a liquid hourly space velocity, LHSV, of 0.5-30 hr$^{-1}$, such as an LHSV of 1-20 hr$^{-1}$, 1-10 hr$^{-1}$, 1-8 hr$^{-1}$ or 1-6 hr$^{-1}$. The LSHV may be based, in part, on the solids content of the lignocellulosic feedstock, the ruthenium content of the catalyst, or a combination thereof.

For example, when the catalyst comprises 2 wt % Ru, the LHSV may be 1-2 hr$^{-1}$. In another example, when the catalyst comprises 8 wt % Ru, the LHSV may be at least 4 hr$^{-1}$, such as 4-20 hr$^{-1}$, 4-10 hr$^{-1}$, or 4-8 hr$^{-1}$. In the catalytic reactor, the crude oil is upgraded via hydrodeoxygenation, denitrification, and/or steam-reformation reactions to provide an upgraded oil having a reduced oxygen content, reduced nitrogen content, reduced acidity, increased H:C mole ratio, reduced density, and/or a reduced viscosity compared to the crude oil. Reforming of light organics (e.g., methanol, ethanol, glycolic acid) produces hydrogen, carbon, and carbon monoxide, and reduces the carbon content of the aqueous fraction. The generated hydrogen subsequently reduces higher molecular weight molecules and participates in the hydrodeoxygenation and denitrification processes. In certain embodiments, the catalyst remains active for at least 100 hours.

The oxygen content of the upgraded oil may be reduced by up to 40% compared to the oxygen content of the crude oil, such as a reduction of 10-30% or 15-25% compared to the crude oil. The nitrogen content of the upgraded oil may be reduced by up to 50% compared to the nitrogen content of the crude oil, such as a reduction of 30-50% or 35-45% compared to the crude oil. The total acid number (TAN) of the upgraded oil may be reduced by up to 70% compared to the TAN of the crude oil, such as a reduction of 10-70% or 30-60% compared to the TAN of the crude oil. The H:C mole ratio of the upgraded oil may be up to 20% higher than the H:C mole ratio of the crude oil, such as 5-20% or 5-15% higher than the H:C mole ratio of the crude oil. The density of the upgraded oil may be up to 20% less than the density of the crude oil, such as from 1-20% or 5-15% less than the crude oil. The viscosity of the upgraded oil may be up to 99% less than the viscosity of the crude oil, such as from 45-99%, 75-98% or 90-98% less than the viscosity of the crude oil. The water content of the upgraded oil may be up to 80% less than the water content of the crude oil, such as from 2-80%, 10-80%, or 25-75% less than the water content of the crude oil.

An upgraded process stream C comprising the upgraded oil and upgraded aqueous fraction flows from the catalytic reactor 103 into an oil-water separator 104, wherein the upgraded oil and upgraded aqueous fraction are separated. The upgraded oil may have an oxygen content within a range of 1-12 wt %, such as 5-10 wt % or 8-10 wt % oxygen. The upgraded oil may have a nitrogen content within a range of from 0-1 wt %, such as from 0.05-0.5 wt % or 0.05-0.3 wt % nitrogen. The upgraded oil may have a total acid number within a range of from 10-50, such as from 20-45. The upgraded oil may have a H:C mole ratio from 1.2-1.3, such as a H:C mole ratio of 1.25-1.3. The upgraded oil may have a water content up to 5 wt %, such as 0.01-5 wt %, 0.1-5 wt %, or 0.1-3 wt % water. The upgraded oil may have a density with a range of 0.9-1.2 g/mL, such as a density of 0.9-1.1 g/mL or 1.0-1.1 g/mL. The upgraded oil may have a viscosity within a range of from 100 cSt to 3200 cSt, such as from 100-2500 cSt or from 150-500 cSt.

In some embodiments, the upgraded aqueous fraction of process stream C has a reduced organic carbon content, a reduced chemical oxygen demand, and/or an increased pH compared to the aqueous fraction of process stream B. The total organic carbon (TOC) content may be reduced by up to 75%, such as from 50-70%, providing a total organic carbon content up to 0.6 wt %, such as a TOC of 0.3-0.5 wt %. The chemical oxygen demand (COD) may be reduced by up to 60%, such as from 35-50%, providing a COD of from 25,000-40,000 mg/mL. The acidity of the aqueous fraction may be significantly reduced, providing a pH of 6-8, such as a pH of 6.5-7.5.

An exemplary comparison of an average process stream B (crude oil; "baseline test") to an average process stream C (upgraded oil; "catalytic test") is provided in Table 1. The dried lignocellulosic biomass composition is also provided in the column titled "Feed range." The C, H, and O weight percentages are averages.

TABLE 1

| | Feed range | Bio-oil/water Baseline tests | Bio-oil/water Catalytic test |
|---|---|---|---|
| Feed dry wt % | 12.5-14 | 13 | 13 |
| wt % Cellulose | 42-47.5 | | |
| wt % Hemicellulose | 21-23 | | |
| wt % Lignin | 25-35 | | |
| wt % Carbon | 47.5 | 79 | 81 |
| wt % Hydrogen | 5.9 | 7.9 | 8.8 |
| wt % Oxygen | 39.5 | 13 | 9.6 |
| wt % Nitrogen | 0.22 | 0.32 | 0.20 |

TABLE 1-continued

| | Feed range | Bio-oil/water Baseline tests | Bio-oil/water Catalytic test |
|---|---|---|---|
| wt % Sulfur | <0.02 | 0.02 | <0.005 |
| wt % ash | 1-7.5 | | |
| H:C mole ratio | | 1.2 | 1.3 |
| LHSV catalyst ($hr^{-1}$) | | n/a | 1.5-8 |
| Oil mass yield % | | 35-37 | 31-37 |
| TAN | | 55 | 22 |
| KF of oil (% water) | | 5.1 | 1.3 |
| Density (g/mL) | | 1.13 | 1.0-1.04 |
| Viscosity (cSt) | | 6400-9300 | 154-176 |
| Product Water COD (mg/L) | | 55500-60000 | 30400-34000 |
| Product Water TOC (wt %) | | 0.87 | 0.41 |
| Product Water pH | | 4.7 | 7.1 |

LHSV = liquid hourly space velocity, TAN = total acid number, KF = Karl Fischer titration, COD = chemical oxygen demand, TOC = total organic carbon As discussed previously, the biomass advantageously is a lignocellulosic biomass comprising less than 1.5 wt % sulfur. Sulfur reacts with hydrogen generated in the catalytic reactor to produce hydrogen sulfide, rendering the hydrogen unavailable for hydrodeoxygenation and/or denitrification reactions and hindering the catalytic process. Biomass having a larger sulfur content, e.g., algae, may be utilized with additional steps to reduce the sulfur content before contact with the sulfided ruthenium catalyst. For example, following liquefaction in the HTL reactor, temperature and pressure may be reduced to vent hydrogen sulfide. Sulfates may be removed by separating the oil and aqueous fractions. The separated oil is then combined with clean water, and the temperature and pressure are increased to suitable levels before the oil/water mixture enters the catalytic reactor.

IV. Examples

General Methods:

A summary of analytical methods is provided in Table 2. The methods are discussed in detail below.

TABLE 2

| Analysis/Analytes | Streams Analyzed | Method/Approach | Instrument | Sample Size |
|---|---|---|---|---|
| Wt % Solids | F, W, BD, FW | Dry/gravimetric | 105 +/− 3° C., oven | 4 to 50 g |
| Ash | F, BO, BD, FW, W | Furnace/gravimetric | 750° C. muffle furnace | 1 to 10 g |
| Macro CHN Analysis | F (solid samples) | ASTM D5373/D5291 | LECO® TruSpec® CHN Macro Analyzer | 25-300 mg |
| Micro CHN Analysis | BO, BD, FW, W | ASTM D5373/D5291 | Perkin Elmer® 2400 II CHN Micro Analyzer | 2-3 mg |
| Total Organic Carbon | F, W, BD | EPA 440 | Eltra® CS-500 | 100 to 200 mg |
| Chemical Oxygen Demand | F, W | HACH 8000 (Hach): Ref. 40 CFR 136.3 | Hach Tube + spectrophotometer | 0.2 g to 2 mL |
| Ammonia | W | HACH TNT832 (Hach); Ref to EPA 350.1, EPA 351.1, EPA 351.2 | Hach Tube + spectrophotometer | 1 mL (diluted) |
| Oxygen | F, BO, BD, FW | ASTM D5373 | LECO® TruSpec® Oxygen Analyzer. | 1 to 2 mg |
| Sulfur | F, BO, BD, FW, W | ASTM D4239 | Eltra® CS-500 Analyzer | 5 to 500 mg |
| Acid Number Analysis | BO | ASTM D3339 | Titration | 50 to 100 mg |
| Karl Fischer-Water | BO | ASTM E203 | Karl Fischer (KF) Coulometer | 50 to 100 mg |
| Gas Composition | G | GC-TCD | Carle | 0.2 mL |
| Organic acids | F, W | HPLC-RID | A Bio-Rad Aminex® HPX-87H+ | 1 to 5 mL |
| Aromatic/Aliphatic Ratio | BO | $^{13}$C NMR | Varian® Inova® 500 spectrometer + Waters 2414 | 0.2 g |

TABLE 2-continued

| Analysis/Analytes | Streams Analyzed | Method/Approach | Instrument | Sample Size |
|---|---|---|---|---|
| Qualitative Identification | BO, W | GC/MS | Agilent ® 6890 GC + Agilent ® 5975C | 0.2 to .5 g |
| Viscosity | F | Gravimetric | Grad cent. Cone and balance | 5 to 50 mL |
| Viscosity/Density | F, BO, W | Per Vendor procedure, ASTM D7042-04 | SVM 3000 Stabinger Viscometer ® Anton Paar ® | 2 to 3 mL |
| Anions | F, W, BD | Ion chromatography | Dionex ® IC | 0.2 to 1 mL |
| Cations (metals) | F, BO, W, BD | ICP-OES | Perkin Elmer ® 7300DV OES | 0.2 to 1 g |
| Oil-Solids filtration | BO | ASTM D7579-09 | Solvent, filter, balance | 1 to 3 g |
| Simulated Distillation | BO | D 2887 | Agilent ® GC/FID with PAC Simulated Distillation software | 1 mL |
| Adiabatic Calorimeter | BO | D 4809 | Parr ® 6400 instrument | 5 mL |

Matrix: F = Feed, BO = Bio-oil, BD = blow down, FW = filter wash, W = water phase, G = gas GC/MS: Gas chromatography/mass spectroscopy for organic compound identification. An Agilent® 6890 GC coupled with an Agilent® 5975C MSD (mass spectral detector) was used for qualitatively component identification. A 30 m 0.25 µm film DB-5MS column was used for separations. A helium carrier gas is used at a flowrate of 1 ml/min. Temperature ramp was as follows: hold at 40° C. for 4 minutes, ramp at 6° C. per minute to 300° C., hold for 2 minutes. Mass spectral data was referenced to a NIST database. HTL aqueous samples were filtered and run neat (aqueous matrix). HTL biocrude samples were run neat or diluted with acetone to reduce viscosity for sample injection.

HPLC-RID: High performance liquid chromatography refractive index detector for quantitative organic acids & alcohols & other select organics. A Bio-Rad Aminex® HPX-87H ion exclusion column (300 mm×7.8 mm) was used for analyte separation followed by a Waters 2414 refractive index detector. Sulfuric acid (0.005 M) was used as eluent at a flow rate of 0.55 mL/min. Column temperature was held at 35° C. Each sample was processed for 45 minutes (diluted samples) to 210 minutes (depending upon sample contents and late eluting material). The calibration (five points, from 0.1 to 2.0 wt %) for all reported analytes was performed after installation of new column and guard column and semi-annually. Independent QC check standards were run for each analyte during calibration. A QC calibration (acetic acid, acetaldehyde, methanol, ethanol and ethyl acetate) was processed with each analytical batch. An independent QC check and blank were processed with every 5 to 10 samples (depending upon analytical batch size). When solids/turbidity was present, HTL aqueous samples were filtered (0.45 µm) and run neat or diluted by 10× (with deionized (DI) water).

IC: Ion chromatography for anions. A Dionex® ICS-3000 equipped with an AS11HC column and conductivity detector was used. A gradient from 0.5 to 40 mM hydroxide was used to separate organic and inorganic anions. The column was held at 30° C. For each analytical batch, the system was calibrated with standard analyte mix (chloride, fluoride, nitrate, sulfate and phosphate) and calibration was verified with an independent quality control check. HTL aqueous product samples were filtered (if needed) and run neat or at 10×, or 100×, depending on analyte concentration. Diluent, if needed, was DI water.

ICP-OES: Inductively coupled plasma optical emission spectroscopy. A Perkin Elmer® 7300DV OES with a cyclonic spray chamber and Meinhard nebulizer was used for ICP analysis. The argon plasma was set at 1350 W. The system was calibrated daily with NIST traceable standards for all reported analytes and cross checked with independent NIST traceable standards. Each analytic batch was processed with a set of independent check standards. Check standards were run with every 5-10 samples. Aqueous samples were settled/centrifuged/filtered as needed to remove turbidity/solids. The samples were serially diluted (with DI water) as needed to bring analytes into the calibration range (less than 10 ppm, as analyzed). Some samples were run at multiple dilutions to address differing sample analyte concentrations. Bio-oil and solids samples were microwave digested in concentrated nitric acid in a sealed vessel (held at 210 C. for 30 minutes). The digestate was qualitatively transferred and diluted to volume with DI water in a volumetric flask (final acid concentration is 20%) and serially diluted as needed to bring analytes into the calibration range.

Macro CHN Analysis (ASTM D5373/D5291): The instrument used in this method was a LECO® TruSpec® CHN Macro Analyzer. Samples were combusted at 950° C. followed by a secondary combustion through the furnace at 850° C. for further oxidation and particulate removal. The gas derived from the combustion was transferred by a carrier gas, homogenized and purged through an IR detector. This detector measures carbon by $CO_2$ gas and hydrogen from $H_2O$. The nitrogen is detected by thermo conductivity in which the $NO_2$ gas from the resulting combustate is measured as nitrogen. The CHN results are then reported as a weight percent. Approximately 25-300 mg of sample was weighed out on a macro-balance, with 0.1 mg capability. The amount of sample used derived from the sample matrix. The sample was then placed into a pre weighed, combustible capsule and dropped into the furnace of the instrument for analysis. The instrument was calibrated for the specific matrix of the sample and the capsule used.

Oxygen Analysis (ASTM D5373, modified): The instrument used in this method was a LECO® TruSpec® Oxygen Analyzer. The sample was put into a capsule and weighed out on a micro balance with 0.001 mg capability. The capsule was dropped into the furnace which operates at 1300° C. In a reduction tube, broken-up $O_2$ was combined with carbon black in the furnace. All $CO_x$ components were flowed through copper oxide and were converted to $CO_2$. This resulting gas was analyzed for oxygen by IR detection.

The instrument was calibrated for the specific matrix of the sample and the capsule used in combustion. The amount of sample used in this method was typically 1-10 mg, depending on the matrix of the sample. The results are reported in weight percent of oxygen in the sample.

Sulfur Analysis (ASTM D4239): The instrument used in this method was an Eltra® CS-500 Analyzer. This instrument tests a sample for total sulfur concentration. The sample was combusted at approximately 1350° C. and the resulting $SO_3$ gas was then analyzed by an infrared cell detector and established as sulfur. Approximately 0.5 to 500 mg of sample was analyzed. The sample weight was determined by the amount of sample available, and the matrix of the sample. The sample was weighed out on a macrobalance with 0.1 mg capability or a micro-balance with 0.001 mg capability. Tin capsules were also used in the combustion process if needed. The sample was placed into a ceramic boat and put into the combustion tube for analysis. The results are reported as weight percent of sulfur in the sample.

Total Organic Carbon (TOC) in Water (EPA Kahn TOC, modified): This method was used to determine the concentration of organic carbon is different types of water matrices. To prepare the sample, a portion of it was combined with concentrated HCl in a vessel to remove any inorganic carbon in the sample. 1-2 mL aliquots of this remaining solution were sealed into capsules. The instrument used in this method was the Eltra® CS-500 Analyzer. The capsule was combusted in the furnace at approximately 1350° C. The resulting $CO_2$ gas was carried by high purity oxygen and analyzed by IR detection to determine the total concentration of carbon in the sample. This result equals the total organic carbon concentration in the sample. The results are reported as the weight percent of total organic carbon in the sample. The instrument was specifically calibrated for this type of matrix and the capsules used in the process.

Acid Number Analysis (ASTM D3339): This method was used to determine the amount of acidic constituents in an oil sample. Acid number was determined by dissolving 50-100 mg of sample with isopropyl alcohol (IPA) and titrating this with a 0.008 M solution of potassium hydroxide in IPA in a nitrogen atmosphere. The sample was weighed into a beaker and brought up to 40 mL with a 95% IPA solution. The dissolved sample was stirred as the 0.008 M KOH in IPA solution titrant was added drop-wise to the beaker until the end point was reached. Alpha naphtholbenzein was used as an indicator. Acid number is reported as the amount of base (mg of KOH) per gram of sample.

Karl Fischer—Water Titration (ASTM E203): This test involves the determination of the total percent water in a sample by a Karl Fischer (KF) Coulometer. The sample was injected directly into the titration cell via syringe or dissolved first in a comparable solvent (depending on water content). The initial and final weights of the syringe were used to accurately determine the amount of sample used. A macro balance with 0.1 mg capability was used for this process. With this weight, the water concentration was then determined by the instrument. This result was found by the Karl Fischer reaction. In this reaction, iodine reacts with a solvent, which is ultimately oxidized by iodine to form a salt. In this process, water is consumed in a 1:1 ratio with iodine. The excess iodine is then detected voltametrically by the titrator's indicator. The amount of water is calculated based on the concentration of the iodine in the cell, and the amount of KF reagent used. The solvent used in this analysis depends on the matrix and polarity of the sample for dilution and solubility purposes. The solvent used was normally chloroform or methanol. The percentage of water is typically reported from 1 ppm to 10%. Samples that contain greater than 10% water were subjected to dilution factors.

Example 1

Ru/C Catalyst Preparation

A 2.5 wt % Ru/C catalyst was prepared with an activated adsorption/immobilization process. The support was a carbon extrudate ($C_E$), i.e., a hot deionized water-washed sample of Norit® ROX 0.8 mm $C_E$.

Carbon extrudate, 500 mL (160.00 g dry weight) was measured and approximately 1500 mL of deionized water was added. The $C_E$ mixture was heated on a steam bath. The amount of ruthenium was calculated: (160.00 g $C_E$ ÷ 0.975)−160.00 g=4.1026 g of Ru required. The ruthenium source was a commercial Ru nitrosyl nitrate solution obtained from BASF (Assay=9.940% Ru by wt.) 4.1026 g Ru needed÷0.09940=41.27 g of $Ru(NO)(NO_3)_3$ solution required. 41.27 g of the Ru nitrosyl nitrate solution was combined separately with deionized water to bring the total solution volume up to ~100 mL.

When the temperature of the water in the $C_E$ mixture had reached ~75° C, the prepared Ru nitrosyl nitrate solution was added while stirring continuously. The solution was maintained at ~75° C for about 20 minutes, with constant stirring, until the solution was nearly colorless again. A pH meter probe was then suspended into the solution and pH adjustment started. While stirring the mixture vigorously, small additions of a freshly prepared 1 M NaOH solution were made until the pH was stable above pH 9. The final solution pH was near 10. The mixture containing the immobilized Ru catalyst was removed from the steam bath and the contents allowed to cool to room temperature.

After cooling, the catalyst solids were separated from the spent impregnation solution, and the catalyst solids were washed to remove retained NaOH and byproduct $NaNO_3$ impurities. Washing with hot D.I. water was terminated when the spent water washings measured less than 30 ppm of dissolved solids content. The catalyst solids were then dried overnight @ 105° C in a drying oven. The dried, immobilized catalyst (still in an oxidized state) is typically activated by reducing the catalyst in a flowing hydrogen atmosphere in a chemical reactor prior to use.

Example 2

Catalytic Tests

Unless otherwise noted, all evaluations were performed at 350° C. and 3000 psig (20.7 MPa), in the absence of added hydrogen. The LHSV is provided for each run below. The feedstock for each run included 12.5-14 wt % dry lignocellulosic biomass (loblolly pine forest product residual) with an average chemical composition of 47.5 wt % carbon, 5.9 wt % hydrogen, 39.5 wt % oxygen, 0.22 wt % nitrogen, <0.02 wt % sulfur, and 7-9% wt % ash.

Wood 29. The catalyst was spent sulfide 7.8 wt % Ru/C from CHG (catalytic hydrothermal gasification). The catalyst LHSV was 1.5 $hr^{-1}$. Compared to the crude oil obtained after hydrothermal liquefaction, the upgraded oil had 30% oxygen reduction, 38% nitrogen reduction in oil, 175% increase in gas production, 7% increase in char. The H:C ratio increased from 1.2 to 1.29, the density dropped from 1.13 g/mL to 1.04 g/mL, and viscosity dropped from 6400 cSt to 154 cSt. There was 41% less carbon in the aqueous fraction after exposure to the catalyst.

The same catalyst used in Wood 29 was used for subsequent run, Wood 32, at the same conditions and same feed to demonstrate longer time on stream and to generate a larger volume of bio-oil for follow-on hydrotreater evaluations. The composition of the biocrude was consistent with Wood 29; however, the density and viscosity were higher at 1.08 g/mL and 1480 cSt, respectively. Bio-oils generated from CAT-HTL runs (Wd29, Wd30, and Wd32) were composited and used as feed in catalytic hydrotreatment testing. The HTL CAT composite biocrude yielded 9% more upgraded product (HT-61573-21) compared to the baseline HTL bio-oil (HT-61573-20). Furthermore, hydrogen consumption during upgrading was about 25% less for the HTL CAT composite vs. the hydrogen consumption for upgrading the baseline HTL biocrude.

Wood 35 (WD35a and b). The catalyst was a fresh edge-coated unsulfided 2.5 wt % Ru/C; "edge-coated" means that the Ru was deposited preferentially near the surface of the carbon particles. With the fresh catalyst, the carbon yield to gas increased from 11% (WD35a, no catalyst) to 34% (Wd35b, with catalyst). The viscosity of the oil decreased from 9370 cSt (Wd35a) to 176 cSt (WD35b) and the density decreased from 1.13 g/mL to 1.0 g/ml. The catalyst LHSV was 6 $hr^{-1}$.

Wood 36 (WD36). This run was a continuation of WD35b (with catalyst) to obtain more time on stream. For WD36, a higher catalyst bed space velocity was used (LHSV of 8 $hr^{-1}$). With the longer time on stream, the catalyst was no longer hyperactive, and the carbon yield to gas was 14% (WD36) vs. 11% (WD35a). The mass yields to biocrude with (WD36) and without catalyst (WD35a) were 30% and 31%, respectively. The bio-oil H:C mole ratio was 1.23 (WD36) vs 1.18 (WD35a)(without catalyst). The TAN (total acid number) dropped from 50 mg KOH/g oil (WD35a) to 32 (WD36). The density decreased from 1.13 g/mL to 1.09 g/mL, the moisture dropped from 7.9% (no catalyst) to 5.1% (with catalyst), and the viscosity decreased from 9370 cSt to 1544 cSt for WD35a to WD36, respectively.

Wood 37 (WD37) and wood 38 (WD38) were catalytic runs conducted with the same catalyst from WD35 and WD36 at a liquid hourly space velocity of 8 $hr^{-1}$ for the catalyst bed. The feed slurry was a mixture of wood particles and HTL aqueous byproduct recycled from previous HTL runs. The bio-oil viscosity was 2290 cSt for WD37 and 3104 cSt for WD38 as compared to the baseline of 9370 cSt (WD35a). The TAN was 45 for WD37 and 44 for WD38. The densities were 1.11 g/mL and 1.12 g/mL, respectively. The carbon yields to bio-oil were 31%, 29% and 36% for WD35a, WD37 and WD38, respectively Wood 39 (WD39a and b) was conducted with a feed slurry prepared from cellulose fibers (Arbocel® B 800 cellulose, from J Rettenmaier USA). For WD39B, the catalyst was the same as used in WD35-38 and the catalyst LHSV was 8 $hr^{-1}$. The mass yield to carbon were the same, 22% with and without the catalyst. However, with the catalyst online, oil quality was improved. Moisture in the bio-oil decreased from 17% (WD39a) to 5.5% (WD39b). Viscosity dropped from 1121 cSt (WD39a) to 576 cSt (WD39b). The H:C mole ratio increased from 1.08 (WD39a) to 1.28 (WD39b).

Run WD43 was performed using only plug flow reactor components. Pressure let-down was accomplished by throttling the entire stream from 3000 psig through a back-pressure regulator to atmospheric pressure. The catalyst LHSV was 24 $hr^{-1}$. This run demonstrated the feasibility of continuous product recovery through a BPR without plugging when the viscosity of the product bio-oil is reduced through catalytic HTL. After pressure reduction, the bio-oil and exolving carbon dioxide gas formed a foam that floated on the surface of the aqueous phase. With time, the bio-oil coalesced with most of it dropping below the water phase. Some oil that stayed on top of the water, but with mixing of the product, the two distinct oil phases combined to form a single oil phase with a density greater than that of the aqueous phase. To test the longevity of the catalyst, a lab scale unit (50 mL/h) was utilized for several weeks on-line with HTL waters (aqueous product from previous HTL runs). Part of the HDO process is to convert the hydrogen donors in the water such as glycolic acid to hydrogen for subsequent HDO of the higher molecular weight oxygenated compounds. This later step was not confirmed in the lifetime catalyst test due to plugging at these very slow flow rates with wood slurries. There was no sign of catalyst activity loss by the end of the test.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for producing oil, comprising:
hydrothermally liquefying a lignocellulosic feedstock comprising (i) 5-30 wt % of a lignocellulosic biomass and (ii) water to produce a composition comprising a crude oil, an aqueous fraction, and inorganic solids;
separating the inorganic solids from the crude oil and the aqueous fraction to provide a process stream comprising the crude oil and the aqueous fraction;
contacting the process stream comprising the crude oil and the aqueous fraction with a sulfided-ruthenium catalyst, in the absence of added hydrogen, at an operating temperature and pressure effective to reduce an oxygen content of the crude oil, reduce a nitrogen content of the crude oil, reduce a total acid number of the crude oil, increase a H:C mole ratio of the crude oil, reduce a density of the crude oil, reduce a moisture content of the crude oil, reduce viscosity of the crude oil, or any combination thereof, thereby producing an upgraded oil and an upgraded aqueous fraction, wherein the sulfided-ruthenium catalyst comprises Ru, S, and a support, and has a Ru:S weight ratio within a range of from 10:1 to 25:1 prior to contact with the process stream; and
subsequently separating the upgraded oil and the upgraded aqueous fraction.

2. The method of claim 1, wherein the sulfided-ruthenium catalyst comprises from 1-10 wt % ruthenium based on a combined mass of the ruthenium and the support.

3. The method of claim 2, wherein contacting the process stream with the sulfided-ruthenium catalyst is performed at a liquid hourly space velocity, LHSV, of 0.5-30 $hr^{-1}$.

4. The method of claim 1, wherein the support comprises partially graphitized carbon, activated carbon, rutile titania, or zirconia.

5. The method of claim 4, wherein the support comprises partially graphitized carbon having a graphite structure content within a range of from 50 to 95 wt %.

6. The method of claim 1, wherein contacting the process stream with the sulfided-ruthenium catalyst is performed at an operating temperature within a range of from 250° C. to 364° C.

7. The method of claim 6, wherein contacting the process stream with the sulfided-ruthenium catalyst is performed at a pressure sufficient to maintain the process stream in liquid phase without forming a supercritical fluid.

8. The method of claim 7, wherein the pressure is within a range of from 2.5 MPa to 4.5 MPa greater than a vapor pressure of the process stream at the operating temperature.

9. The method of claim 1, wherein contacting the process stream with the sulfided-ruthenium catalyst is performed at an operating temperature within a range of from 340° C. to 360° C. and a pressure within a range of from 18 MPa to 22 MPa.

10. The method of claim 1, wherein the method is a plug-flow process.

11. The method of claim 1, wherein the lignocellulosic biomass comprises 20-40 wt % lignin based on the dry matter mass of the lignocellulosic biomass.

12. The method of claim 1, wherein the lignocellulosic biomass comprises ≤1.5 wt % sulfur based on the dry matter mass of the lignocellulosic biomass.

13. The method of claim 1, wherein the lignocellulosic feedstock comprises from 1 ppm to 1,000 ppm sulfur by weight.

14. The method of claim 1, further comprising exposing a ruthenium catalyst to an aqueous solution comprising a sulfate salt, in the absence of added hydrogen, to produce the sulfided ruthenium catalyst.

15. The method of claim 14, wherein the aqueous solution comprises from 100 ppm to 1000 ppm sulfate.

16. The method of claim 14, wherein the ruthenium catalyst is exposed to the aqueous solution at an operating temperature within a range of from 250° C. to 364° C.

17. The method of claim 16, wherein the ruthenium catalyst is exposed to the aqueous solution at a pressure that maintains the aqueous solution in liquid phase at the operating temperature without forming a supercritical fluid.

18. The method of claim 1, wherein hydrothermally liquefying the lignocellulosic feedstock comprises subjecting the lignocellulosic feedstock to an effective liquefaction temperature and liquefaction pressure to thermally depolymerize organic constituents of the lignocellulosic biomass.

19. The method of claim 18, wherein the effective liquefaction temperature is within a range of 250-364° C. and the effective liquefaction pressure is greater than a vapor pressure of the lignocellulosic feedstock at the effective liquefaction temperature.

* * * * *